United States Patent
Makofsky et al.

(10) Patent No.: US 10,203,838 B2
(45) Date of Patent: *Feb. 12, 2019

(54) AVATAR PERSONALIZATION IN A VIRTUAL ENVIRONMENT

(71) Applicant: Disney Enterprises, Inc., Burbank, CA (US)

(72) Inventors: Steven Makofsky, Sammamish, WA (US); Paul Cutsinger, Redmond, WA (US)

(73) Assignee: Disney Enterprises, Inc., Burbank, CA (US)

(*) Notice: Subject to any disclaimer, the term of this patent is extended or adjusted under 35 U.S.C. 154(b) by 282 days.

This patent is subject to a terminal disclaimer.

(21) Appl. No.: 15/005,563

(22) Filed: Jan. 25, 2016

(65) Prior Publication Data

US 2016/0155256 A1 Jun. 2, 2016

Related U.S. Application Data

(63) Continuation of application No. 13/767,275, filed on Feb. 14, 2013, now Pat. No. 9,285,951.

(51) Int. Cl.

| | |
|---|---|
| *G06K 9/00* | (2006.01) |
| *A63F 13/79* | (2014.01) |
| *G06T 13/40* | (2011.01) |
| *H04L 29/12* | (2006.01) |
| *G06F 3/0481* | (2013.01) |
| *A63F 13/655* | (2014.01) |

(52) U.S. Cl.
CPC .......... *G06F 3/04815* (2013.01); *A63F 13/79* (2014.09); *G06K 9/00275* (2013.01); *G06K 9/00281* (2013.01); *G06T 13/40* (2013.01); *H04L 61/3065* (2013.01); *A63F 13/655* (2014.09); *A63F 2300/5553* (2013.01)

(58) Field of Classification Search
CPC ..... G06T 13/40; G06T 13/20; G06K 9/00275; G06K 9/00281; G06F 3/04815; H04L 61/3065; H04L 61/3015; H04L 26/12622; A63F 13/79; A63F 13/655; A63F 2300/5553

See application file for complete search history.

(56) References Cited

U.S. PATENT DOCUMENTS

| | | | |
|---|---|---|---|
| 6,545,682 B1 * | 4/2003 | Ventrella | G06F 3/011 345/473 |
| 2008/0133512 A1 * | 6/2008 | Myhre | G06F 17/2264 |
| 2008/0262910 A1 * | 10/2008 | Altberg | G06Q 30/02 705/14.69 |
| 2009/0044113 A1 * | 2/2009 | Jones | G06T 13/40 715/707 |
| 2009/0309891 A1 * | 12/2009 | Karkanias | G06F 19/3418 345/581 |

(Continued)

*Primary Examiner* — Nicholas Ulrich (74) *Attorney, Agent, or Firm* — Patterson + Sheridan, LLP (57) ABSTRACT

Techniques are disclosed to facilitate avatar personalization in a virtual environment. A request to generate an avatar in the virtual environment to represent a requesting entity is received. Data pertaining to the requesting entity is retrieved, the data not specifying any visual appearance of the avatar. A proposed avatar is generated based on the retrieved data. The proposed avatar is output to the requesting entity.

20 Claims, 6 Drawing Sheets

(56) References Cited

U.S. PATENT DOCUMENTS

| | | | |
|---|---|---|---|
| 2010/0274887 A1* | 10/2010 | Sanghavi | G06Q 30/02 709/224 |
| 2011/0022965 A1* | 1/2011 | Lawrence | G06F 3/011 715/747 |
| 2011/0143834 A1* | 6/2011 | Guinn | G07F 17/32 463/25 |
| 2011/0239143 A1* | 9/2011 | Ye | G06F 3/048 715/764 |
| 2011/0292051 A1* | 12/2011 | Nelson | G06K 9/00281 345/467 |
| 2011/0296324 A1* | 12/2011 | Goossens | G06Q 10/10 715/763 |
| 2012/0264511 A1* | 10/2012 | Marsland | H04L 67/38 463/31 |
| 2012/0309520 A1* | 12/2012 | Evertt | G06T 19/20 463/31 |
| 2013/0086081 A1* | 4/2013 | Schonfeld | G06F 17/3089 707/748 |
| 2013/0257877 A1* | 10/2013 | Davis | A63F 13/12 345/473 |
| 2014/0078144 A1* | 3/2014 | Berriman | A63F 13/10 345/426 |

* cited by examiner

AVATAR PERSONALIZATION IN A VIRTUAL ENVIRONMENT

This application is a continuation of co-pending U.S. patent application Ser. No. 13/767,275, filed Feb. 14, 2013. The aforementioned related patent application is herein incorporated by reference in its entirety.

BACKGROUND

A virtual world is a simulated environment in which users may interact with virtual objects and locations of the virtual world. Each user may control a respective avatar through which the user may interact with other users' avatars in the virtual world. An avatar generally provides a graphical representation of an individual within the virtual world environment. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Some virtual worlds are described as being persistent. A persistent world provides an immersive environment (e.g., a fantasy setting used as a setting for a role-playing game, or a virtual world complete with land, buildings, towns, and economies) that is generally always available and where events continue to occur regardless of the presence of a given avatar. Thus, unlike more conventional online games or multi-user environments, the virtual world continues to exist and plots and events continue to unfold as users enter (and exit) the virtual world. Virtual environments are presented as images on a display screen and some virtual environment may allow users to record events that occur within the virtual environment.

SUMMARY

Embodiments presented in this disclosure provide a method, computer-readable medium, and system for performing an operation to facilitate avatar personalization in a virtual environment. The operation includes receiving a request to generate an avatar in the virtual environment to represent a requesting entity. The operation also includes retrieving data pertaining to the requesting entity. The retrieved data does not explicitly specify any visual appearance of the avatar and does not explicitly specify any name for the avatar. The operation also includes generating a proposed avatar based on the retrieved data pertaining to the requesting entity. The proposed avatar has a visual appearance that is not based on any music content of the requesting entity. The proposed avatar is output to the requesting entity responsive to the received request.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features, advantages and objects of embodiments presented in this disclosure are attained and can be understood in detail, a more particular description of the embodiments, briefly summarized above, may be had by reference to the embodiments thereof which are illustrated in the appended drawings.

It is to be noted, however, that the appended drawings illustrate only typical embodiments disclosed herein and are therefore not to be considered limiting of its scope, for the disclosure may admit to other equally effective embodiments.

DETAILED DESCRIPTION

Embodiments presented in this disclosure provide techniques for detecting information about the real-world context of a user and using the detected information to customize an experience of the user in the virtual environment, such as an avatar of the user or any other aspect of the virtual environment as perceived by the user. In one embodiment, a technique for avatar personalization is provided that includes generating a proposed avatar based on data pertaining to a requesting entity, such as the user. At least in some embodiments, the data does not specify any visual appearance of the avatar desired by the requesting entity. Depending on the embodiment, the data—referred to herein as user data—may include such data as facial data of the user, location data of the user, trend data associated with the location of the user, music library data of the user, and so forth. The proposed avatar includes a programmatically determined avatar aspect, such as an avatar name or a visual appearance aspect of the avatar. The user may then confirm the proposed avatar or modify the proposed avatar to the liking of the user. Once confirmed, the proposed avatar may be finalized. Accordingly, the techniques disclosed herein may facilitate avatar personalization for the user at least in some cases. As a result, users of the virtual environment may enjoy avatars having names or visual appearances that are more meaningful or personally relevant, thus improving user enjoyment of the virtual environment.

Accordingly, and as described in further detail below in conjunction with the Figures, embodiments presented in this disclosure determine a context for a user and applies the context to an avatar representing the user. In some embodiments, the context is obtained from sensors such as a camera, a microphone, a Global Positioning System (GPS) module, light sensors, accelerometers, etc. Context may also be determined based on a device of the user. For example, context may be derived based on music library data stored on the device in order to determine a style of clothing for the avatar. Context may also be determined based on trending topics in a predefined geographical location (such as "coffee" in Seattle), a particular fashion style of a predefined geographical location. For example, if the predefined geographical location is a Disneyland theme park and the user is detected to be currently within the theme park, then Disney-themed virtual merchandise may be applied to the avatar.

Depending on the embodiment, each avatar may be a two-dimensional or three-dimensional avatar. Further, each avatar may resemble any biological organism such as a human or an animal, any inanimate object such as a car or an airplane, or any mythical, fictional, or imaginary organism such as a unicorn or a dragon. Depending on the embodiment, the inanimate object may include anthropomorphic characteristics, such as eyes and lips.

Figure 1:
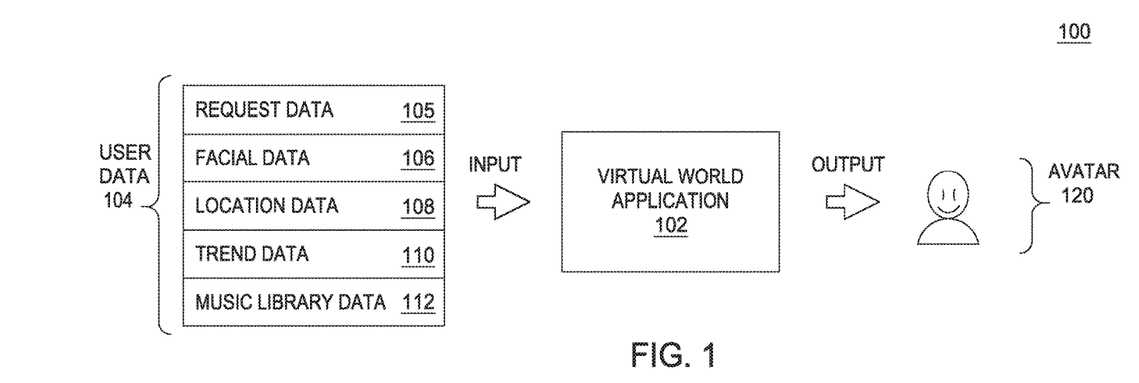
FIG. 1 is a data flow diagram illustrating an application configured to facilitate avatar personalization in a virtual environment, according to one embodiment presented in this disclosure.

FIG. 1 is a data flow diagram 100 illustrating an application configured to facilitate avatar personalization in a virtual environment, according to one embodiment presented in this disclosure. As shown, the application is a virtual world application 102 that generates an avatar 120 based on user data 104. Depending on the embodiment, the virtual world application 102 may be a client application or a server application, as is further described below in conjunction with FIG. 2. The user data 104 includes, without limitation, request data 105, facial data 106, location data 108, trend data 110, and music library data 112. In one embodiment, the request data 105 includes data manually provided by the user to the virtual world application 102. For example, the request data 105 may such data as a real name of the user; a physical mailing address of the user; a billing address of the user; a date of birth of the user; a gender of the user; a city, state, or country of the user; an age of the user, etc. In other embodiments, the user data does not explicitly specify any visual appearance of the avatar and does not explicitly specify any name for the avatar.

In one embodiment, the facial data 106 includes data obtained based on facial recognition of the user, e.g., via a front- or back-facing camera of a portable device of the user or via a webcam device operatively connected to a computer or laptop of the user. In one embodiment, the facial data includes photos of the user or recorded video of the user or still images thereof. Additionally or alternatively, the facial data may specify identified features of the user, such as face shape, skin color, hair color, hairstyle, eye color, eye type, ear type, nose type, mouth type, chin type. In one embodiment, each feature type has a corresponding feature shape. The identified features may further include one or more distances between facial features such as eyes, nose, or mouth. The facial data may further specify identified accessories worn by the user, such as the color or type of glasses, earrings, necklaces, hats, etc. The facial data may further specify the color or type of clothing worn by the user, such as a shirt, a jacket, pants or a skirt, shoes, etc.

At least in some embodiments, if the facial data does not specify any identified features, accessories, or clothing of the user, then the virtual world application 102 evaluates the facial data to identify visual aspects of the user, based on a set of predefined facial recognition rules. For example, the virtual world application 102 may apply a first rule specifying to scan a photo of the user to detect pixel colors matching a set of predefined facial pixel colors. The virtual world application 102 may then compute a predetermined function of the detected pixel colors, such as an average of the detected pixel colors, to determine a facial color of the user.

As another example, the virtual world application 102 may apply a second rule specifying how to detect a face or facial features of the user in the photo. In some embodiments, the detection may be based at least in part on the matching pixel colors of the first rule. As an alternative example, a third rule may specify that pixel colors near a detected nose of the user in the photo are to be used or weighted more heavily in determining the facial color of the user. A fourth rule may specify that pixel colors above detected eyes of the user and that differ from the facial color of the user beyond a predefined threshold difference are hair colors.

As a further example, a fifth rule may specify that pixel colors below a detected mouth of the user and that differ from the facial color of the user beyond a predefined threshold difference are clothing colors. A sixth rule may specify to perform background removal by marking pixels satisfying prescribed background criteria, as to be disregarded by other rules. Depending on the embodiments, the predefined thresholds may be the same or distinct. In an additional embodiment, the virtual world application 102 detects changes in the facial data pertaining to the user and updates the proposed or finalized avatar accordingly. In some embodiments, the user is prompted to confirm the updates, before the updates to the avatar are finalized.

Further, at least in some embodiments, the end-user or the administrative user of the virtual world application 102 may configure the level of detail of facial recognition performed by the virtual world application 102. For example, at a low setting for the level of detail, only face color, hair color, and clothing color are identified. At a high setting for the level of detail, all facial features, accessories, and clothing are detected. Those skilled in the art would recognize that Intervening settings of the level of detail are broadly contemplated in the present disclosure.

In one embodiment, the location data 108 includes such data as global positioning system (GPS) data obtained via a GPS module of a handheld device of the user, cell tower triangulation data obtained via the mobile phone of the user, and a network address of a device of the user. In some embodiments, the location data 108 may include geographical data derived based on the network address, such as by using a predefined geolocation technique to approximate a location of the user in the physical world. An example of a network address is an Internet Protocol (IP) address, and an example of a geolocation technique is GeoIP. At least in some embodiments, the virtual world application 102 is configured to derive the geographical data based on the network address and via the predefined geolocation technique.

In one embodiment, the trend data 110 includes such data as trending topics pertaining to a geographical region of the user. Depending on the embodiment, the geographical region of the user may be manually specified by the user or programmatically determined based on the location data 108. The trend data may be determined by querying a trend data store based on a set of query criteria, where the trend data store is operatively connected to the virtual world application 102 via a network. The trend data store may represent web trending data including frequency of searches of a given topic by users from a given geographic region; a frequency of blog posts, micro-blog posts, or comments on the given topic by the users; a number of articles covering the given topic from newspapers of the geographic region; fads specific to the geographic region, etc. In one embodiment, the trend data store includes a business intelligence (BI) data store. The set of query criteria may specify a desired location for which to retrieve trend data.

In one embodiment, the trending topics may include a trending point of interest in the geographical region or a trending subject of interest in the geographical region. Examples of trending points of interest include a trending town name, a trending street name, a trending location name, a trending store name, a trending restaurant name, etc. Examples of trending subjects of interest include a trending person name, a trending event name, a trending activity name, a trending product name, a trending service name, and a trending media content name, such as a movie, show, album, or song name.

In one embodiment, the music library data 112 includes such data as albums, songs, and audio-books downloaded, purchased, or accessed by the user. The music library data 112 may also include historical information, such as logged instances of playing each element in the music library. The music library data 112 may further include statistical information such as playback frequency or playback pattern of each element in the music library. For example, the playback frequency may indicate that the user has more frequently played a first song over a second song. The playback pattern may indicate that the user more frequently plays the second song on weekends. In some embodiments, the virtual world application 102 determines the statistical information based on the historical information and based further on a set of predefined statistical rules. For instance, a first statistical rule may specify to identify playback patterns based on day of week or based on season of year.

At least in some embodiments, other subsets of the user data 104—e.g., the facial data 106, the location data 108, the trend data 110, and the music library data 112, which may also referred to herein as non-request data—are not manually provided by the user to the virtual world application 102. The user data 104 is further described below in conjunction with FIGS. 3 and 7.

Although embodiments are described herein with reference to user data containing request data, facial data, location data, trend data, and music library data, other embodiments are broadly contemplated. For example, in some embodiments, the user data may additionally or alternatively include application data or sensor data. In one embodiment, the sensor data is obtained from a sensor such as a camera, GPS module, light sensor, accelerometer, microphone or other audio capture unit, etc. The application data specifies what applications are installed on a device of the user or frequently accessed by the user. For example, if the virtual world application 102 detects that a threshold number of applications are installed that satisfy a first set of prescribed criteria, the virtual world application 102 may apply, to the avatar, changes satisfying a second set of set of prescribed criteria. For instance, if the user has five or more Disney applications installed, the virtual world application 102 may apply Disney-themed virtual clothing to the avatar of the user.

Further, although embodiments are described herein with reference to personalizing an avatar based on user data, other embodiments are broadly contemplated. For example, in some embodiments, the user data may be used to personalize any aspect of the virtual environment experienced by the avatar (or by the user of the avatar). For example, in one embodiment, the virtual world application 102 may select a background or scenery of the avatar in the virtual environment, based on audio data captured by a microphone of the user. For instance, if the user is determined to be in a forest based on characteristic sounds associated with a forest, that are detected by a microphone unit of the smartphone of the user, the background or scenery of the avatar may be changed into a forest.

Figure 2:
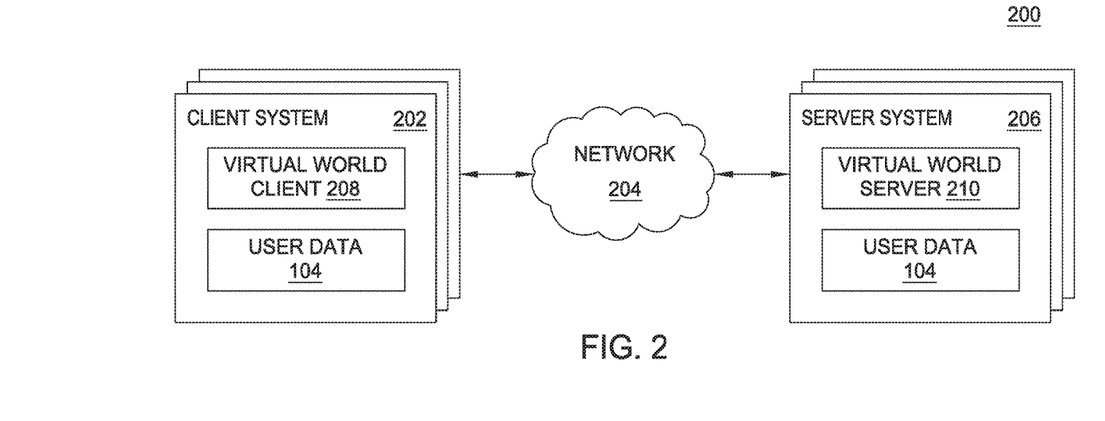
FIG. 2 is a block diagram illustrating a networked system configured to facilitate avatar personalization in the virtual environment, according to one embodiment presented in this disclosure.

FIG. 2 is a block diagram illustrating a networked system 200 configured to facilitate avatar personalization in a virtual environment, according to one embodiment presented in this disclosure. As shown, the system 200 includes a plurality of client systems 202 connected to a plurality of server systems 206 via a network 204. As described above, depending on the embodiment, the virtual world application 102 may be a virtual world client 208, a virtual world server 210, or both. Each of the client systems 202 is configured to operate the virtual world client 208. Examples of the client systems 202 include, without limitation, console gaming systems (e.g., the Microsoft Xbox 360®, the Sony Playstation® 3, etc.), handheld gaming systems (e.g., the Nintendo 3DS™ and DS™, the Sony PSP®, etc.), personal computer gaming systems and so on.

In one embodiment, the server systems 206 are configured to operate the virtual world server 210. Generally, the virtual world server 210 is configured to receive connections from users (e.g., via the virtual world clients 208) and to manage a virtual environment and interactions between the users within the virtual environment. In one embodiment, the virtual environment is a virtual world. The virtual world client 208 or the virtual world server 210 may generate the avatar 120 based on the user data 104. Accordingly, users may obtain personalized avatars more easily or more efficiently at least in some cases.

Figure 3:
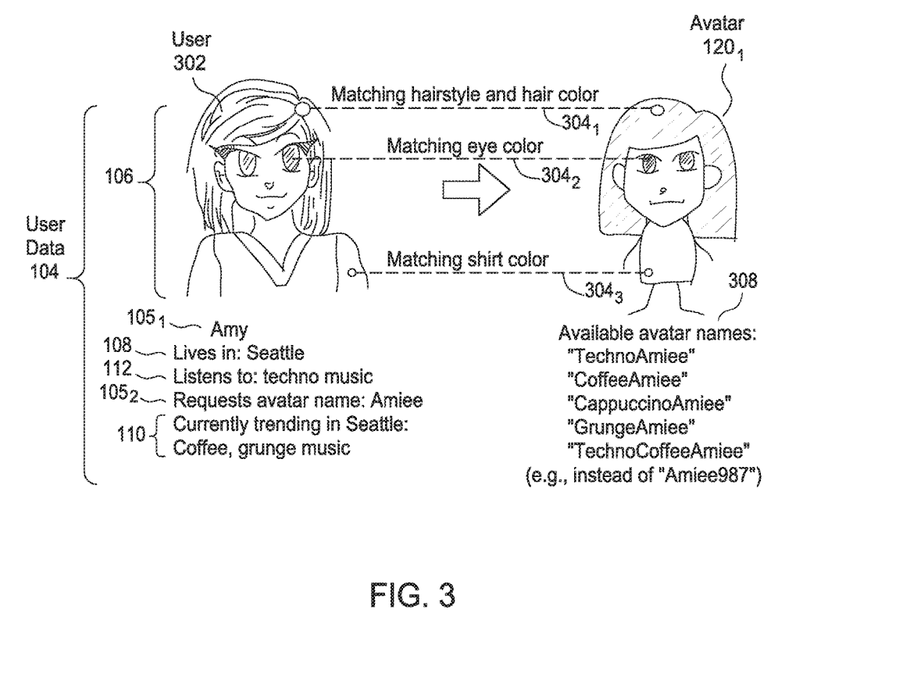
FIG. 3 illustrates a proposed avatar generated by the application, according to one embodiment presented in this disclosure.

FIG. 3 illustrates a proposed avatar generated by the virtual world application 102 of FIG. 1, according to one embodiment presented in this disclosure. As described above, the virtual world application 102 is configured to generate the avatar 102 based on the user data 104. As shown, the user data 104 includes facial data 106, which represents a photo of Amy, a user 302 of the virtual world application 102. The user data 104 further includes request data 105, which specifies "Amy" as the name of the user and "Amiee" as a desired avatar name. The user data 104 further includes location data 108, which is not manually provided by the user, Amy. The location data 108 specifies that Amy is currently living in Seattle, Wash. The user data 104 further includes trend data 110, which indicates that "coffee" and "grunge music" are popular topics in Seattle currently. The user data 104 further includes music library data 112, which specifies that Amy prefers listening to the "techno" genre of music.

In one embodiment, based on the user data 104, the virtual world application 102 generates the avatar $120_1$ for the user Amy. As indicated via dotted lines 304, the avatar has a hairstyle, a hair color, an eye color, and a shirt color resembling those in the photo of Amy and as identified by the virtual world application 102 using the facial recognition techniques described above. Additionally or alternatively, upon determining that the desired avatar name is not available, the virtual world application 102 generates a set of proposed avatar names 308 that are available for use by Amy. For example, the desired avatar name, "Aimee", may already be taken by another user of the virtual environment. In such a scenario, the virtual world application 102 may generate the proposed avatar names 308 according to a predefined function of the desired avatar name and a keyword programmatically determined based on the retrieved data. In one embodiment, the predefined function specifies to perform a concatenation.

For example, the virtual world application 102 may suggest a first avatar name of "TechnoAmiee", based on concatenating the desired avatar name and a keyword of "techno" determined based on the music library data 112. A second avatar name of "CoffeeAimee" may also be suggested based on concatenating the desired avatar name and a keyword of "coffee" determined based on the trend data 110.

At least in some embodiments, keywords are not limited to words actually occurring in the user data 104 but may also include words that are semantically related to the words that occur in the user data 104. The virtual world application 102 may determine what words are semantically related to a given word based on a predefined ontology of semantically related words. For instance, upon determining that "cappuccino" is semantically related to the word "coffee", the virtual world application 102 may additionally suggest a third avatar name of "CappuccinoAimee"—even through the word "cappuccino" may not necessarily appear in the trend data 110. Further still, a fourth avatar name of "GrungeAmiee" is suggested based on concatenating the desired avatar name and a keyword of "grunge" determined based on the trend data 110.

Moreover, other predefined functions are broadly contemplated in the present disclosure. For example, while the avatar names above are described with reference to concatenating two strings, any number of strings, in whole or in part, may also be concatenated to generate a suggested avatar name. For example, a fifth avatar name of "TechnoCoffeeAmiee" may be suggested based on concatenating three strings: the desired avatar name, the keyword of "techno" determined based on the music library data 112, and the keyword of "coffee" determined based on the trend data 110.

In one embodiment, one of the suggested avatar names, such as "TechnoAmiee", may be selected for the user by default. The default selection may be determined based on a predefined set of desirability criteria evaluating a length of each avatar name, whether each avatar name includes the desired avatar name, whether each avatar name includes a number, etc. At least in some embodiments, avatar names that are short, that include the desired avatar name, and that do not include a number are determined as being the most desirable among the suggested avatar names.

By generating avatar names based on the techniques disclosed herein, the virtual world application 102 may facilitate personalization of avatar names in a virtual environment at least in some cases. More specifically, the avatar names generated using the techniques disclosed herein may be more user-friendly, intuitive, meaningful, and personally relevant to the users at least in some cases, at least relative to alternative approaches of generating the avatar names. One example of an alternative approach includes appending a number at the end of a desired avatar name that is unavailable for use by the requesting user, e.g., "Amiee987". Accordingly, generating the avatar names using the techniques disclosed herein may improve user satisfaction with avatar names, thus improving user enjoyment of the virtual environment and reducing a likelihood of users losing access to avatars as a result of lost avatar names or passwords, at least in some cases.

Figure 4:
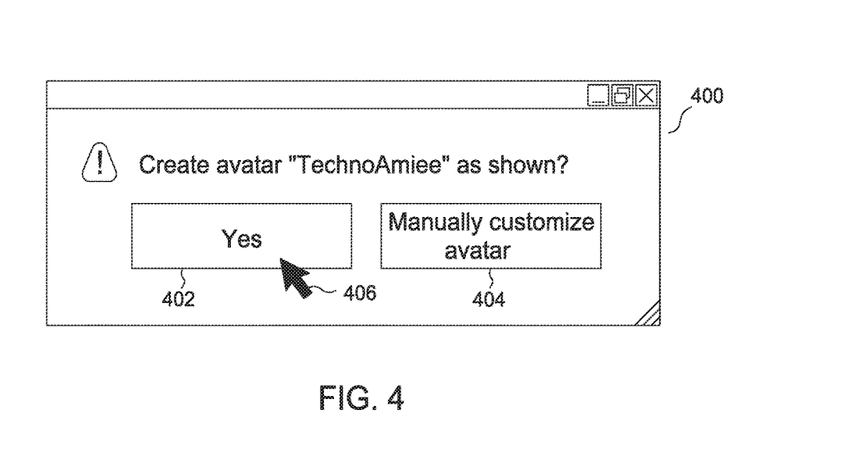
FIG. 4 illustrates a graphical user interface (GUI) screen of the application of FIG. 1, according to one embodiment presented in this disclosure.

FIG. 4 illustrates a graphical user interface (GUI) screen 400 of the virtual world application 102 of FIG. 1, according to one embodiment presented in this disclosure. Continuing the above example, assume that Amy confirms selection of the avatar name "TechnoAimee". In response, the virtual world application 102 may request Amy to specify whether to create—i.e., to finalize—the proposed avatar having the selected avatar name, as shown in the GUI screen 400. The GUI screen 400 includes a cursor 406 controlled using a user input device, such as via a mouse. If the user responds in the affirmative by activating a "Yes" button 402 using the cursor 406, the virtual world application 102 finalizes creation of the avatar. Alternatively, if the user responds in the negative by activating a "Manually customize avatar" button 404 using the cursor 406, the virtual world application 102 modifies one or more aspects of the avatar based on additional input specified by the user. Modifying the one or more aspects of the avatar is further described below in conjunction with FIG. 6.

Figure 5:
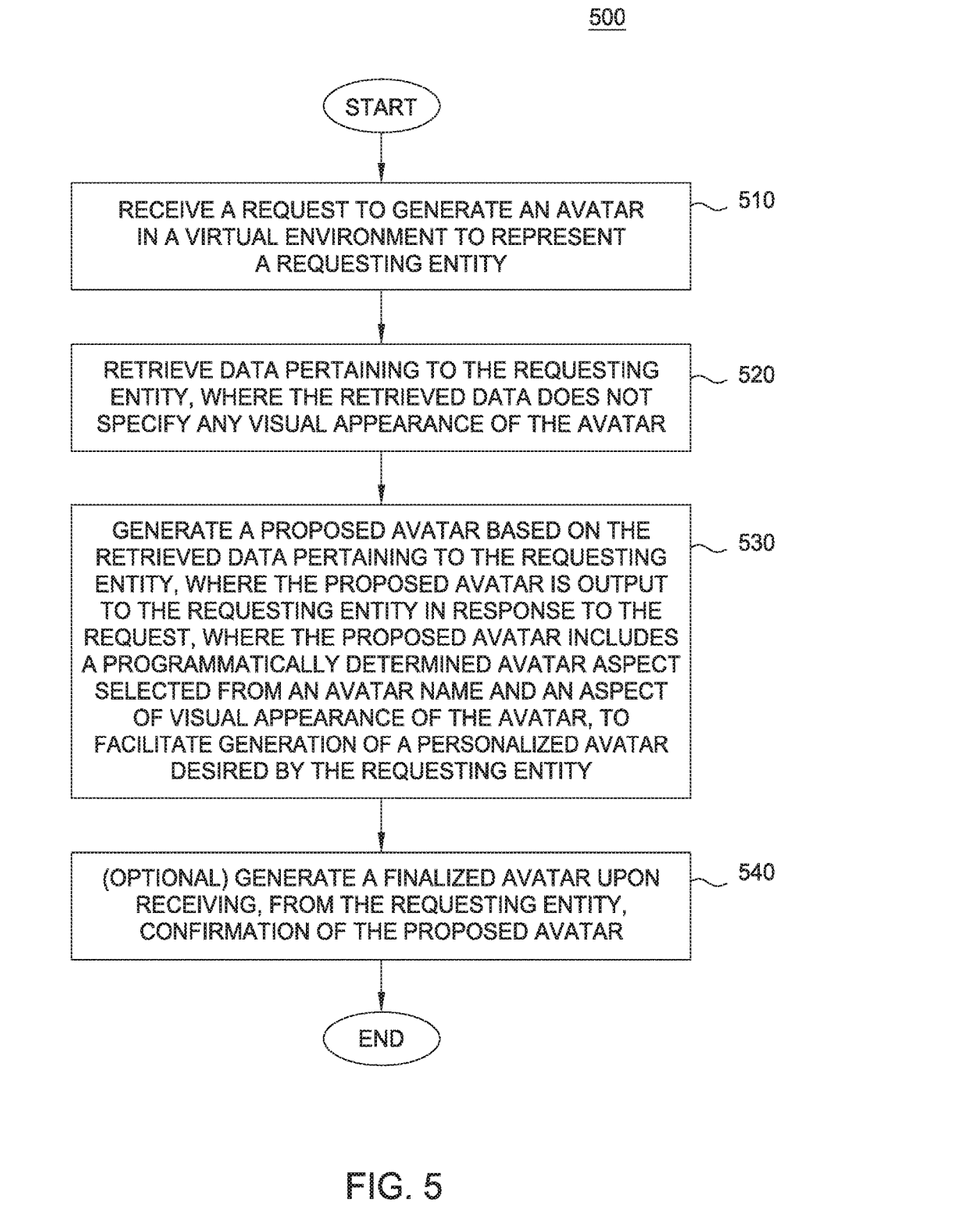
FIG. 5 is a flowchart depicting a method to facilitate avatar personalization in the virtual environment, according to one embodiment presented in this disclosure.

FIG. 5 is a flowchart depicting a method 500 to facilitate avatar personalization in a virtual environment, according to one embodiment presented in this disclosure. As shown, the method 500 begins at step 510, where the virtual world application 102 receives a request to generate an avatar in a virtual environment to represent a requesting entity, such as a user. At step 520, the virtual world application 102 retrieves data pertaining to the requesting entity. At least in some embodiments, the retrieved data does not specify any visual appearance of the avatar desired by the requesting entity.

At step 530, the virtual world application 102 generates a proposed avatar based on the retrieved data pertaining to the requesting entity. The proposed avatar is output to the requesting entity in response to the request. In some embodiments, the proposed avatar includes a programmatically determined avatar aspect, which is selected from an avatar name and an aspect of visual appearance of the avatar. The avatar aspect is programmatically determined to facilitate generation of a personalized avatar desired by the requesting entity. At step 540, the virtual world application 540 optionally generates the finalized avatar upon receiving, from the requesting entity, confirmation of the proposed avatar. After the step 540, the method 500 terminates.

Figure 6:
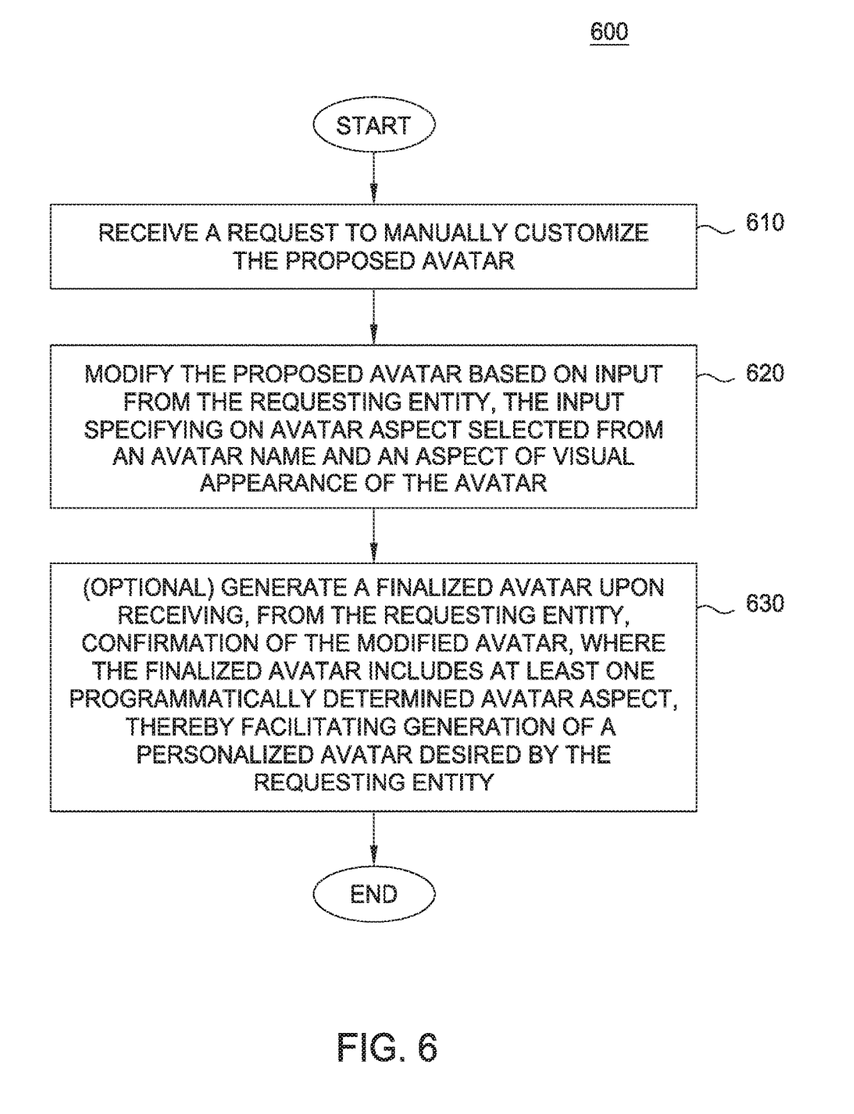
FIG. 6 is a flowchart depicting a method to incorporate user modifications to a proposed avatar, according to one embodiment presented in this disclosure.

FIG. 6 is a flowchart depicting a method 600 to incorporate user modifications to a proposed avatar, according to one embodiment presented in this disclosure. As shown, the method 600 begins at step 610, where the virtual world application 102 receives, from the requesting entity, a request to manually customize the proposed avatar. At step 620, the virtual world application 102 modifies the proposed avatar based on input from the requesting entity. The input specifies an avatar aspect, which may be an avatar name or an aspect of visual appearance of the avatar.

At step 630, the virtual world application 102 optionally generates a finalized avatar upon receiving, from the requesting entity, confirmation of the modified avatar. At least in some embodiments, the finalized avatar includes at least one programmatically determined avatar aspect different from the manually modified avatar aspect, thus facilitating generation of a personalized avatar desired by the requesting entity. After the step 630, the method 600 terminates.

Figure 7:
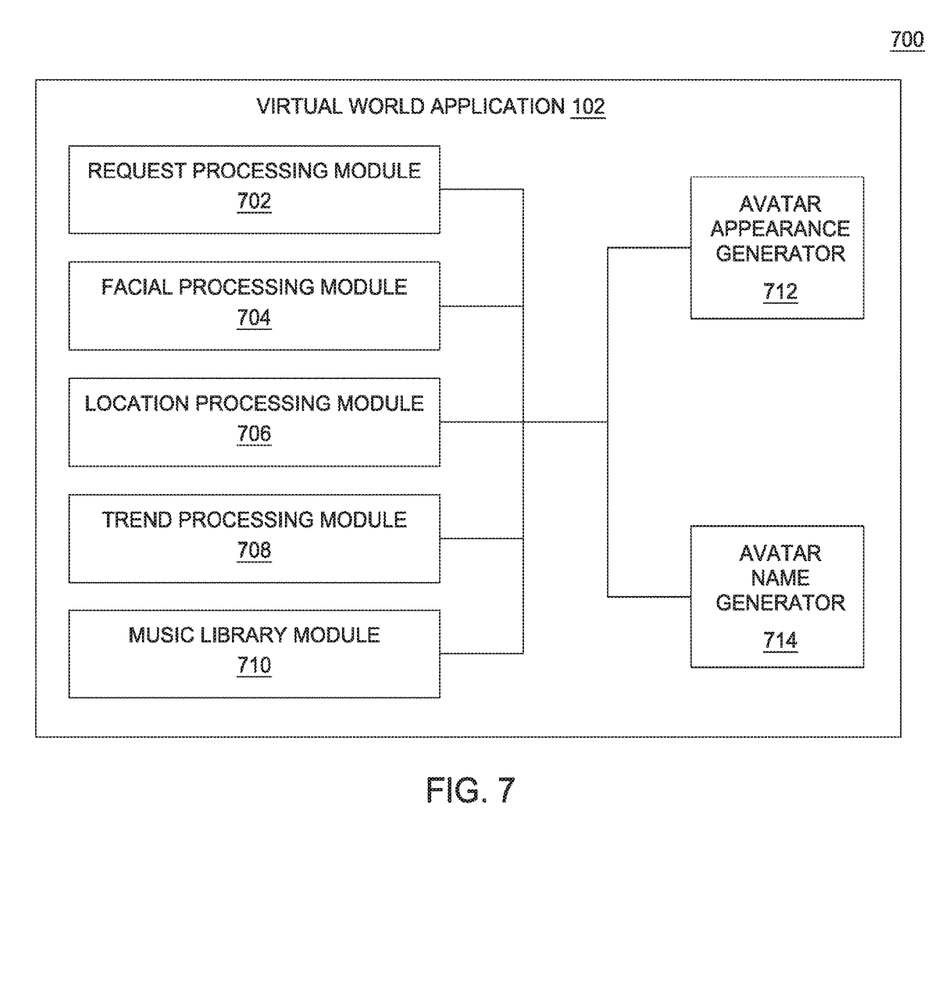
FIG. 7 is a block diagram illustrating components of the application configured to facilitate avatar personalization in a virtual environment, according to one embodiment presented in this disclosure.

FIG. 7 is a block diagram illustrating components 700 of the virtual world application 102 of FIG. 1, according to one embodiment presented in this disclosure. As shown, the components 700 include a request processing module 702, a facial processing module 704, a location processing module 706, a trend processing module 708, and a music library module 710. The components 700 further include an avatar appearance generator 712 and an avatar name generator 714. Those skilled in the art will recognize that the components 700 of the virtual world application 102 are merely exemplary, and other ways of implementing the virtual world application 102 are broadly contemplated in the present disclosure.

In one embodiment, the request processing module 702 is configured to process the received request and the second avatar aspect that is defined by the requesting entity. The facial processing module 704 is configured to retrieve facial data obtained via facial recognition of the requesting entity. Alternatively, the facial processing module 702 may generate facial data using image or video capture and facial recognition techniques. The location processing module 706 is configured to retrieve the location data and determine geographical data based on network address data. The trend processing module 708 is configured to retrieve trend data by querying the trend data store based on a set of query criteria, which may be determined based on the location data. The music library module 710 is configured to retrieve the music library data and determine one or more music genres preferred by the requesting entity, based on the music library data.

In one embodiment, the avatar appearance generator 712 is configured to programmatically define one or more aspects of the avatar, based on the user data provided by the modules 702, 704, 706, 708, 710 of the virtual world application 102. The avatar name generator 714 is configured to programmatically generate one or more avatar names, based on the user data provided by the modules 702, 704, 706, 708, 710. In some embodiments, the avatar name generator 714 may verify the generated avatar names against a set of avatar names belonging to other users of the virtual environment. Doing so allows the virtual world application 102 to output, to the requesting entity, only those names that are verified to be available for use by the requesting entity.

Other embodiments not departing from the scope of the present disclosure are broadly contemplated. For instance, in one embodiment, the virtual world application 102 may generate proposed avatars having a given aspect—such as visual appearance or avatar name—that is not based on one or more specified types of the user data 104, e.g., the request data 105, the facial data 106, the location data 108, the trend data 110, and the music library data 112. In a specific embodiment, the proposed avatar has a physical appearance that is not based on the music library data 112 or any music content contained in the music library itself. Depending on the embodiment, the given aspect is either not at all based on the specified types of user data 104 or merely not solely based on the specified types of user data 104. Additionally or alternatively, in some embodiments, each avatar belongs to and is controlled by a respective end-user of the virtual environment, and each avatar does not additionally serve as any user interface for the end-user to access a music library of the end-user. In such embodiments, for instance, the end-user cannot click on his or her own avatar to browse the music library or to play a song.

Embodiments disclosed herein present techniques for facilitating avatar personalization in a virtual world. In one embodiment, a virtual world application is provided that generates a proposed avatar based on data pertaining to a requesting entity. The proposed avatar includes a proposed avatar aspect selected from an avatar name and a visual appearance aspect of the avatar. Accordingly, users of the virtual environment may enjoy avatars having names or visual appearances that are more meaningful or personally relevant at least in some cases. User enjoyment of the virtual environment may be improved as a result.

Figure 8:
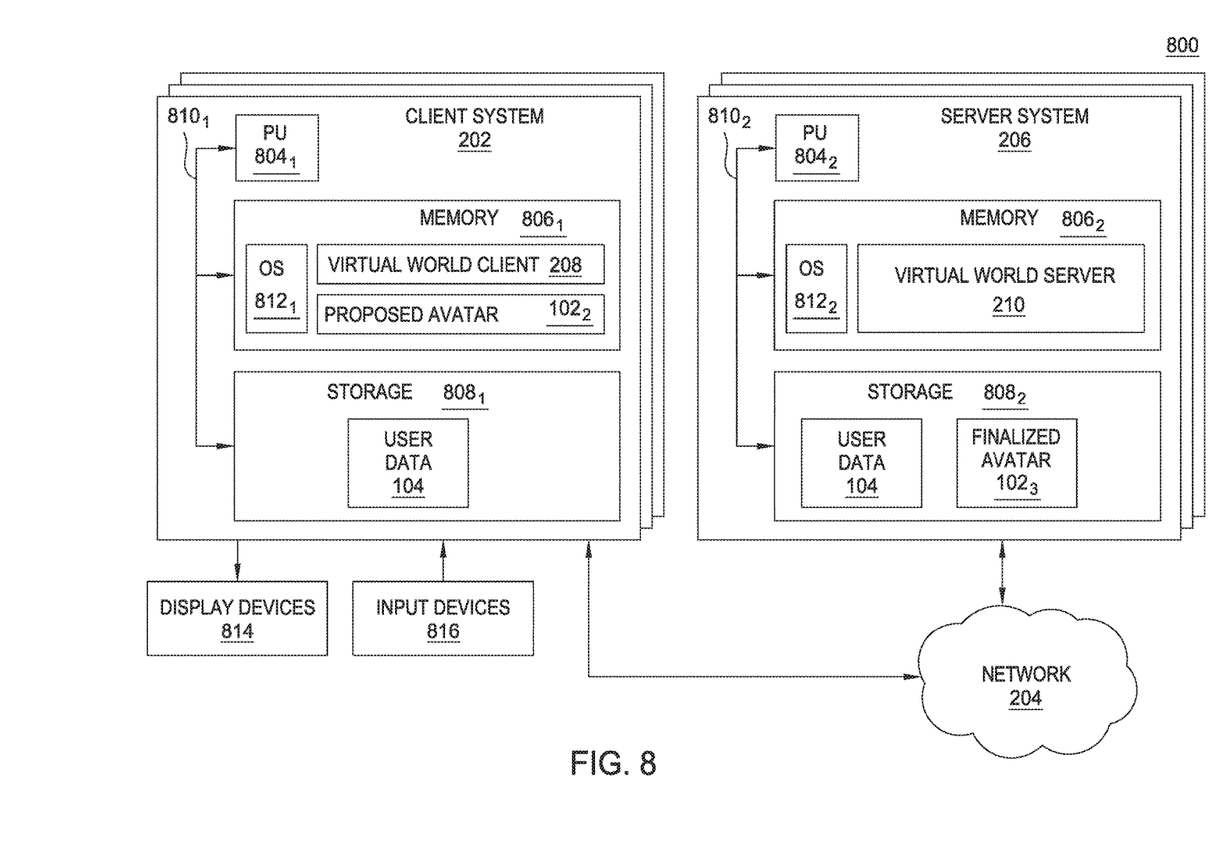
FIG. 8 is a block diagram illustrating components of the networked system configured to facilitate avatar personalization in the virtual environment, according to one embodiment presented in this disclosure.

FIG. 8 is a block diagram illustrating a networked system 800 configured to facilitate avatar personalization in a virtual environment, according to one embodiment presented in this disclosure. The networked system 800 corresponds to the networked system 200 of FIG. 2. As shown, the system 800 includes a plurality of client systems 202 and a plurality of server systems 206, communicatively coupled via the network 204.

In one embodiment, the client systems 202 may include existing computer systems, e.g., desktop computers, server computers, laptop computers, tablet computers, gaming consoles, hand-held gaming devices and the like. The client systems 202 illustrated in FIG. 8, however, are merely examples of computer systems in which embodiments disclosed herein may be used. Embodiments disclosed herein may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments disclosed herein may be implemented using any device or computer system capable of performing the functions described herein.

As shown, each client system 202 and server system 206 includes, without limitation, a processor 804, which obtains instructions and data via a bus 810 from a memory 806 and storage 808. The processor 804 is a programmable logic device that performs instruction, logic, and mathematical processing, and may be representative of one or more CPUs. The memory 806 is any memory sufficiently large to hold the necessary programs and data structures. The memory 806 could be one or a combination of memory devices, including Random Access Memory, nonvolatile or backup memory (e.g., programmable or Flash memories, read-only memories, etc.).

As shown, the memory 806 includes an operating system ("OS") 812. Operating system 812 is software used for managing the operation of the client system 202 or the server system 206. Examples of the OS 812 include UNIX, versions of the Microsoft Windows® operating system and distributions of the Linux® operating system. Additional examples of the OS 812 include custom operating systems for gaming consoles, including the custom operating systems for systems such as the Microsoft Xbox 360®, Nintendo Wii® and Sony PlayStation® 3. As shown, the memory $806_1$ of the client system 202 further includes the virtual world client 208 and a proposed avatar $102_2$ according to embodiments described above. The memory $806_2$ of the server system 206 further includes the virtual world server 210.

The storage 808 is representative of hard-disk drives, flash memory devices, optical media and the like. Generally, the storage 808 stores application programs and data for use by the client systems 202. In addition, the memory 806 and the storage 808 may be considered to include memory physically located elsewhere; for example, on another computer coupled to the client system 202 or to the server system 206 via the bus 810. The client systems 202 and the server systems 206 are operably connected to the network 204, e.g., via network interfaces. As shown, the storage $808_1$ of the client system 202 includes the user data 104. Additionally or alternatively, the storage 808₂ of the server system 206 includes the user data 104. The storage 808₂ of the server system 206 further includes a finalized avatar 102₃ according to embodiments described above.

Additionally, the client systems 202 each are coupled to display devices 814 and input devices 816, respectively. The display devices 814 may include output devices such as monitors, touch screen displays, and so on. For instance, the display devices 814 may include a display device used to visually depict a virtual environment. As an example, the display 814 may provide a touch sensitive surface allowing the user to select different locations within the virtual environment and control the movement of an avatar within the virtual environment. The input devices 816 represent a wide variety of input devices, including keyboards, mice, controllers, and so on. Furthermore, the input devices 816 may include a set of buttons, switches or other physical device mechanisms for controlling the client system 202. For example, the input devices 816 could include a set of directional buttons used to navigate an avatar through a virtual environment presented on the display 814. Additionally or alternatively, the input devices 816 may also include one or more sensors such as cameras, microphones, GPS modules, accelerometers, light sensors, etc.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the virtual world server 210) or related data available in the cloud. For example, the virtual world server 210 could execute on a computing system in the cloud and receive a login request from a user (e.g., from the virtual world client 208 associated with the user). In such a case, the virtual world client 208 or the virtual world server 210 could generate a personalized avatar for the user, which may facilitate the avatar customization process for the user and thus improve user enjoyment of the virtual environment at least in some cases.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method of avatar personalization in a virtual environment, based on user aspect, geographic region, and topic of interest, the computer-implemented method comprising:
   receiving a request to generate an avatar in the virtual environment to represent a user;
   detecting a facial skin color of the user by analyzing an image depicting the user, wherein the image is analyzed based on one or more facial recognition rules;
   determining a topic of interest pertaining to a geographic region of the user;
   generating, by operation of one or more computer processors, a proposed avatar having a visual appearance based on the detected facial skin color of the user and further having a name comprising a concatenation of: (i) a desired name for the avatar and (ii) the topic of interest pertaining to the geographic region; whereafter the proposed avatar is output to the user responsive to the received request; and
   subsequent to finalizing the proposed avatar, controlling movement of the finalized avatar in the virtual environment in real-time based on input from the user.

2. The computer-implemented method of claim 1, wherein the facial skin color constitutes an aspect pertaining to the user, wherein the aspect pertaining to the user comprises an aspect of visual appearance of the user, wherein the aspect pertaining to the user, the topic of interest, and the geographic region are distinct from one another, wherein the request is received from a requesting entity selected from the user and another user, wherein the proposed avatar includes at least a first avatar aspect that is programmatically defined based on retrieved data pertaining to the user, thereby facilitating generation of a personalized avatar desired by the user, wherein the aspect of visual appearance comprises an aspect of physical appearance of the user, wherein the proposed avatar is output to the requesting entity responsive to the received request, wherein the aspect of physical appearance of the user is determined without requiring any user input explicitly specifying any aspect of physical appearance of the user, wherein the topic of interest pertaining to the geographic region of the user is determined without requiring any user input explicitly specifying any topic of interest.

3. The computer-implemented method of claim 2, further comprising:
   retrieving the data pertaining to the user, wherein the retrieved data is exclusive of any visual appearance of the avatar and is exclusive of any name for the avatar;
   determining the geographic region of the user absent any user input explicitly specifying any geographic region of the user; and
   determining a music preference of the user absent any user input explicitly specifying any music preference of the user, wherein the name of the proposed avatar is further based on the determined music preference;
   wherein finalizing the proposed avatar comprises generating a finalized avatar including: (i) the first avatar aspect that is programmatically defined and (ii) a second avatar aspect that is defined by the requesting entity; wherein the first avatar aspect and the second avatar aspect are different aspects, wherein the first avatar aspect is not defined by the user, wherein the second avatar aspect is not programmatically defined.

4. The computer-implemented method of claim 3, wherein the proposed avatar is generated by a virtual world application, wherein the topic of interest comprises a trending topic pertaining to the geographic region, wherein the aspect of physical appearance comprises a facial feature, wherein the desired name is specified in the received request, wherein the name of the avatar is determined to be available for use by the user, wherein the computer-implemented method further comprises:

programmatically modifying the finalized avatar upon detecting a change in the visual appearance of the user.

5. The computer-implemented method of claim 4, wherein the virtual world application is configured to individually and programmatically define each first avatar aspect based individually on each retrieved data selected from: (i) facial data obtained via facial recognition of the user; (ii) location data of the user, wherein the location data is selected from global positioning system (GPS) data, network address data, and cell tower triangulation data; (iii) trend data determined based on the location data; (iv) music library data pertaining to a music library of the user; (v) music genre data determined based on the music library data; and (vi) audio data from an audio capture unit associated with the user;

wherein the requesting entity comprises the user, who is a user of the virtual world application, wherein the proposed avatar is generated to facilitate avatar personalization, such that the user does not need to specify any input for customizing the first avatar aspect, wherein the retrieved data does not pertain to the virtual environment, wherein the network address data comprises an Internet Protocol (IP) address of the user.

6. The computer-implemented method of claim 5, wherein the virtual world application is configured to individually and programmatically define each first avatar aspect based individually on each facial data selected from: (i) a first facial data characterizing a facial geometry of the user; (ii) a second facial data characterizing a skin color of the user; (iii) a third facial data characterizing a hair color of the user; (iv) a fourth facial data characterizing facial features of the user, the facial features including eyes, ears, nose, mouth, and chin, wherein each facial feature is determined based on a respective, distinct facial recognition rule; (v) a fifth facial data characterizing an accessory worn by the user, wherein the accessory is selected from glasses, earrings, necklace, and hat; and (vi) a sixth facial data characterizing clothing worn by the user.

7. The computer-implemented method of claim 6, wherein the trend data characterizes the topic of interest pertaining to the geographic region of the user, wherein the geographic region is determined based on the location data, wherein the virtual world application is configured to individually and programmatically define each first avatar aspect based individually on each trending topic selected from:

(i) a trending point of interest in the geographic region, wherein the trending point of interest is selected from a trending town name, a trending street name, a trending location name, a trending store name, and a trending restaurant name; and (ii) a trending subject of interest in the geographic region of the user, wherein the trending subject of interest is determined based on web trending data, wherein the trending subject of interest selected from a trending person name, a trending event name, a trending activity name, a trending product name, a trending service name, and a trending media content name.

8. The computer-implemented method of claim 7, wherein the virtual world application comprises:

(i) a request processing module configured to process the received request and the second avatar aspect that is defined by the user;

(ii) a facial processing module configured to retrieve the facial data obtained via facial recognition of the user;

(iii) a location processing module configured to retrieve the location data;

(iv) a trend processing module configured to retrieve the trend data based on the location data;

(v) a music library module configured to retrieve the music library data and to determine the music genre data based on the music library data;

(vi) an avatar appearance generator configured to programmatically define the first avatar aspect of the avatar; and (vii) an avatar name generator configured to generate a plurality of avatar names including the name of the avatar;

wherein the avatar appearance generator is configured to, in a given instance, generate the visual appearance of the proposed avatar without regard to any music preference of the user;

wherein the virtual world application is configured to generate a plurality of names for the proposed avatar, the plurality of names including the name, wherein each of the topic of interest, the geographic region, and the musical preference influences a respective one of the plurality of names.

9. The computer-implemented method of claim 1, wherein the facial skin color constitutes an aspect pertaining to the user, wherein the aspect of the user is determined absent any user input explicitly specifying any aspect of the user.

10. The computer-implemented method of claim 1, wherein the topic of interest pertaining to the geographic region of the user is determined without requiring any user input explicitly specifying any topic of interest.

11. The computer-implemented method of claim 1, further comprising:

determining the geographic region of the user without requiring any user input explicitly specifying any geographic region of the user.

12. The computer-implemented method of claim 1, further comprising:

determining a music preference of the user without requiring any user input explicitly specifying any music preference of the user, wherein at least one of the name of the proposed avatar and the visual appearance of the proposed avatar is further based on the determined music preference.

13. A non-transitory computer-readable medium containing a program, which when executed, is configured to perform an operation for avatar personalization in a virtual environment, based on user aspect, geographic region, and topic of interest, the operation comprising:

receiving a request to generate an avatar in the virtual environment to represent a user;

detecting a facial skin color of the user by analyzing an image depicting the user, wherein the image is analyzed based on one or more facial recognition rules;

determining a topic of interest pertaining to a geographic region of the user;

generating, by operation of one or more computer processors when executing the program, a proposed avatar having a visual appearance based on the detected facial skin color of the user and further having a name comprising a concatenation of: (i) a desired name for the avatar and (ii) the topic of interest pertaining to the geographic region; whereafter the proposed avatar is output to the user responsive to the received request; and subsequent to finalizing the proposed avatar, controlling movement of the finalized avatar in the virtual environment in real-time based on input from the user.

14. The non-transitory computer-readable medium of claim 13, wherein the facial skin color constitutes an aspect pertaining to the user, wherein the aspect of the user is determined absent any user input explicitly specifying any aspect of the user.

15. The non-transitory computer-readable medium of claim 13, wherein the operation further comprises:
   determining the geographic region of the user without requiring any user input explicitly specifying any geographic region of the user.

16. The non-transitory computer-readable medium of claim 13, wherein the operation further comprises:
   determining a music preference of the user without requiring any user input explicitly specifying any music preference of the user, wherein at least one of the name of the proposed avatar and the visual appearance of the proposed avatar is further based on the determined music preference.

17. A system of avatar personalization in a virtual environment, based on user aspect, geographic region, and topic of interest, the system comprising:
   one or more computer processors;
   a memory containing a program, which when executed by the one or more computer processors is configured to perform an operation comprising:
      receiving a request to generate an avatar in the virtual environment to represent a user;
      detecting a facial skin color of the user by analyzing an image depicting the user, wherein the image is analyzed based on one or more facial recognition rules;
      determining a topic of interest pertaining to a geographic region of the user;
      generating a proposed avatar having a visual appearance based on the detected facial skin color of the user and further having a name comprising a concatenation of: (i) a desired name for the avatar and (ii) the topic of interest pertaining to the geographic region; whereafter the proposed avatar is output to the user responsive to the received request; and
      subsequent to finalizing the proposed avatar, controlling movement of the finalized avatar in the virtual environment in real-time based on input from the user.

18. The system of claim 17, wherein the facial skin color constitutes an aspect pertaining to the user, wherein the aspect of the user is determined absent any user input explicitly specifying any aspect of the user.

19. The system of claim 17, wherein the operation further comprises:
   determining the geographic region of the user without requiring any user input explicitly specifying any geographic region of the user.

20. The system of claim 17, wherein the operation further comprises:
   determining a music preference of the user without requiring any user input explicitly specifying any music preference of the user, wherein at least one of the name of the proposed avatar and the visual appearance of the proposed avatar is further based on the determined music preference.

* * * * *